(12) United States Patent
Moore et al.

(10) Patent No.: US 8,683,495 B1
(45) Date of Patent: Mar. 25, 2014

(54) SYNC POINT COORDINATION PROVIDING HIGH THROUGHPUT JOB PROCESSING ACROSS DISTRIBUTED VIRTUAL INFRASTRUCTURE

(75) Inventors: James J. Moore, Los Angeles, CA (US); Jeffrey Nick, Hopkinton, MA (US); Subramanian Kartik, Lisle, IL (US); Mahesh Seshadri, Louisville, KY (US)

(73) Assignee: EMC Corporation, Hopkinton, MA (US)

( * ) Notice: Subject to any disclaimer, the term of this patent is extended or adjusted under 35 U.S.C. 154(b) by 675 days.

(21) Appl. No.: 12/827,400

(22) Filed: Jun. 30, 2010

(51) Int. Cl.
*G06F 3/00* (2006.01)
*G06F 9/455* (2006.01)

(52) U.S. Cl.
USPC .............................................. 719/319; 718/1

(58) Field of Classification Search
None
See application file for complete search history.

(56) References Cited

U.S. PATENT DOCUMENTS

| | | | |
|---|---|---|---|
| 2006/0143350 A1* | 6/2006 | Miloushev et al. | 710/242 |
| 2006/0265436 A1* | 11/2006 | Edmond et al. | 707/204 |
| 2009/0089860 A1* | 4/2009 | Forrester et al. | 726/3 |
| 2010/0031254 A1* | 2/2010 | Chin et al. | 718/1 |
| 2010/0070726 A1* | 3/2010 | Ngo et al. | 711/162 |

OTHER PUBLICATIONS

"Torque Admin Manual," Cluster Resources, Version 2.4.5, http://www.clusterresources.com/products/torque/docs/, 2 pages, Jul. 7, 2010.
Ian Shields, "Linux Tip: Job Scheduling with Cron and At," http://www.ibm.com/developerworks/linux/library/I-job-scheduling.html, Jul. 2007, 9 pages.
"VMWare vSphere," http://www.vmware.com/products/vsphere/, 1 page, 2010.
"EMC Replication Manager," http://www.emc.com/products/detail/software/replication-manager.htm, 1 page, 2010.

* cited by examiner

*Primary Examiner* — Tuan Dao
(74) *Attorney, Agent, or Firm* — Ryan, Mason & Lewis, LLP (57) ABSTRACT

An information processing system in an illustrative embodiment comprises a sync point coordinator providing resilient high throughput job processing via coordinated resource scheduling across a distributed virtual infrastructure. In one aspect, a processing device of the information processing system comprises a processor coupled to a memory. The processing device implements a controller configured to coordinate interaction of each of multiple sync point components of the information processing system with distributed virtual infrastructure of the information processing system. The controller is coupled between each of the sync point components and the distributed virtual infrastructure. The controller may comprise, for example, a sync point coordinator having a schedule optimization module, and the sync point components may include, for example, a throughput scheduler, a resource manager, a job management system and a snapshot management system.

19 Claims, 4 Drawing Sheets

SYNC POINT COORDINATION PROVIDING HIGH THROUGHPUT JOB PROCESSING ACROSS DISTRIBUTED VIRTUAL INFRASTRUCTURE

FIELD OF THE INVENTION

The present invention relates generally to the field of information processing, and more particularly to techniques for coordinating the operation of multiple architectural components in an information processing system comprising distributed virtual infrastructure.

BACKGROUND OF THE INVENTION

Virtualization is being rapidly adopted across the information technology industry. Virtualization generally allows any number of virtual machines to run on a single physical machine, with each virtual machine sharing the resources of that one physical machine. Different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords an ability for multiple operating systems to run concurrently on a single physical computer and share hardware resources with each other.

Commercially available virtualization software such as VMware® vSphere™ may be used to build complex virtual infrastructure, including private and public cloud computing and storage systems, distributed across hundreds of interconnected physical computers and storage devices. Such arrangements advantageously avoid the need to assign servers, storage devices or network bandwidth permanently to each application. Instead, the available hardware resources are dynamically allocated when and where they are needed. High priority applications can therefore be allocated the necessary resources without the expense of dedicated hardware used only at peak times.

As virtual infrastructure becomes more complex and more widely distributed over larger numbers of physical machines, coordinating the operation of multiple architectural components becomes increasingly important. For example, multiple architectural components such as throughput schedulers and resource managers may be provided by different vendors and yet all may require interaction with the same underlying hardware. This can present a significant problem in that there is generally no formal coordination among such components in conventional implementations.

SUMMARY OF THE INVENTION

Illustrative embodiments of the present invention overcome the above-described deficiencies of conventional practice by providing a controller, also referred to herein as a sync point coordinator, for coordinating the operation of multiple sync point components such as throughput schedulers, resource managers, job management systems and snapshot management systems, in an information processing system that comprises distributed virtual infrastructure. The sync point coordinator may be advantageously configured to implement advanced scheduling algorithms for high throughput job processing across the distributed virtualized infrastructure.

In accordance with an aspect of the invention, a processing device of an information processing system comprises a processor coupled to a memory. The processing device implements a controller configured to coordinate interaction of each of multiple sync point components of the information processing system with distributed virtual infrastructure of the information processing system. The controller is coupled between each of the sync point components and the distributed virtual infrastructure. The controller may comprise a sync point coordinator having a schedule optimization module.

The illustrative embodiments advantageously overcome the above-noted drawbacks of conventional approaches that fail to provide formal coordination among architectural components such as throughput schedulers, resource managers, job management systems and snapshot management systems. The sync point coordinator in one or more of these embodiments provides a level of interoperability, control, resilience and ease of use that has not heretofore been available. For example, it provides a generic interaction interface that facilitates use of distributed virtual infrastructure by a wide variety of different architectural components that are potentially supplied by different vendors.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of systems comprising distributed virtual infrastructure.

Figure 1:
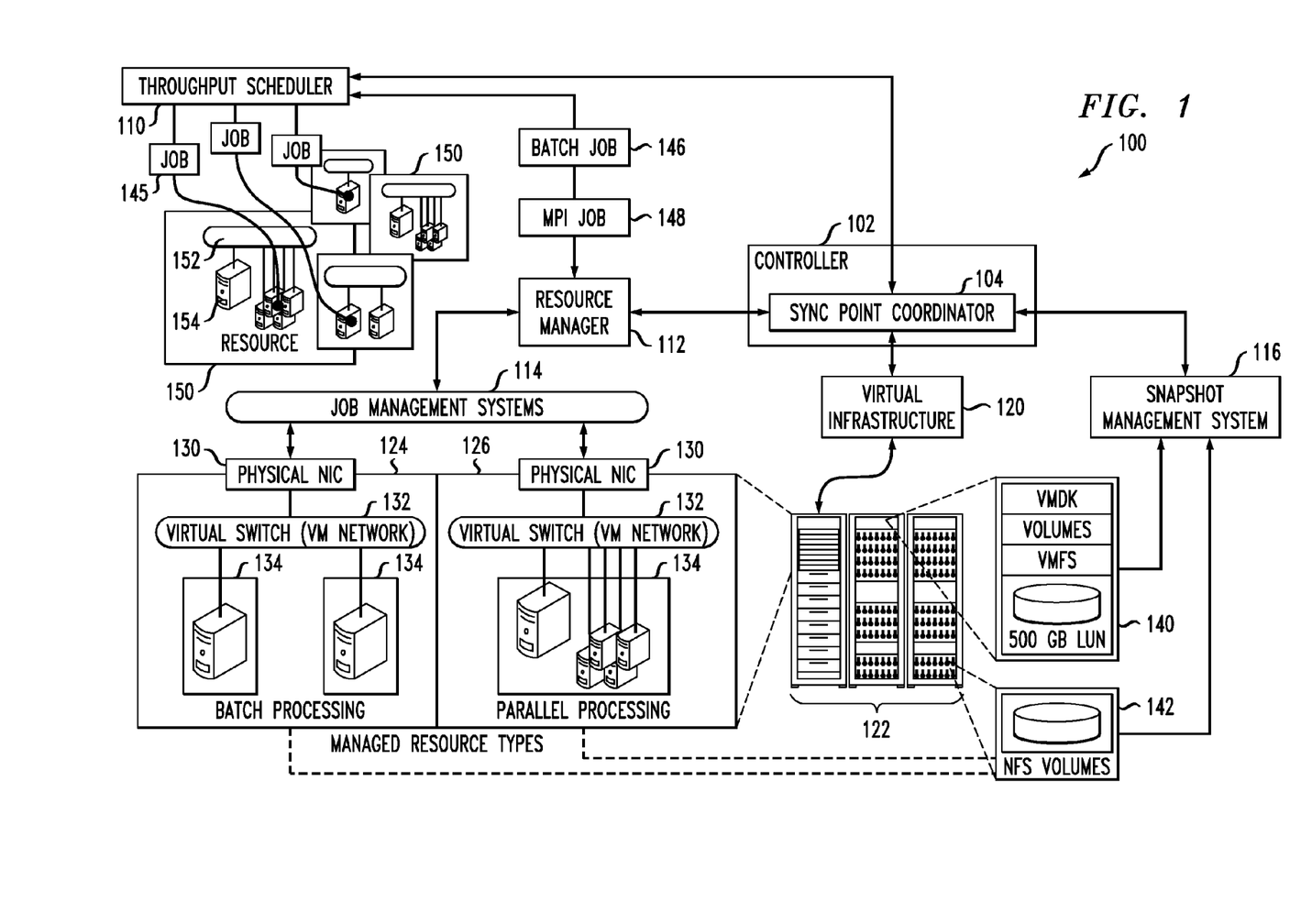
FIG. 1 is a block diagram showing one example of an information processing system comprising a sync point coordinator, multiple sync points and a distributed virtual infrastructure in an illustrative embodiment of the invention.

FIG. 1 shows an example of an information processing system 100 which includes a controller 102. The controller 102 includes a sync point coordinator 104. The sync point coordinator 104 is configured to interact with a number of different architectural components, including a throughput scheduler 110, a resource manager 112, a set of one or more job management systems 114, and a snapshot management system 116. The sync point coordinator 104 also interacts with a virtual infrastructure 120 which in this embodiment is based on distributed processing platforms 122. The processing platforms 122 may comprise computing platforms or other types of processing hardware including computers, servers and other processing devices in any combination. The components 110, 112, 114, 116 and 120 are also referred to herein as "synchronization points" or "sync points" as their operations are synchronized through the sync point coordinator 104. The term "distributed virtual infrastructure" as used herein is intended to encompass, by way of example and without limitation, arrangements such as virtual infrastructure 120 in combination with at least a portion of its associated distributed processing platforms 122.

It should be noted that the particular type and arrangement of sync points shown in FIG. 1 is by way of illustrative example only, and other embodiments may include a wide variety of other types and arrangements of sync points. For instance, another type of sync point that may be included in an embodiment of the invention in place of or in addition to one or more of the sync points shown in FIG. 1 is a time synchronization system, which may comprise a Network Time Protocol Server such as ntpd.

The sync point coordinator 104 may run on a computer, server or other processing platform element, which may be viewed as an example of what is more generally referred to herein as a "processing device." Such a device generally comprises at least one processor and an associated memory, and implements functional modules for controlling certain aspects of the information processing system 100.

The virtual infrastructure 120 comprises a hypervisor and associated services that allow physical systems, network and data to be abstracted into their virtual form. An example of a commercially available hypervisor suitable for use in an embodiment of the invention is the above-noted VMware® vSphere™. As indicated previously, the virtual infrastructure 120 is associated with distributed processing platforms 122, which may comprise, for example, hardware products such as Celerra® and Clariion®, both commercially available from EMC Corporation of Hopkinton, Mass.

The information processing system 100 provides high throughput job processing across the distributed virtual infrastructure 120 through the use of the sync point coordinator 104 and the defined sync points. While each sync point may have an existing purpose in its particular technical discipline, the coordination across sync point functional domains in the FIG. 1 system provides higher order capabilities. The sync point coordinator, sync points and associated virtual infrastructure combine to form a resilient distributed virtualized high throughput computing infrastructure.

The sync point coordinator 104 has a full view of the entire high throughput computing infrastructure. It coordinates interactions among the individual sync points 110, 112, 114, 116 and 120 to achieve a particular high level operation. Each sync point generally denotes a particular system providing a fundamental functionality type within the high throughput job processing system.

The throughput scheduler 110 is an entry point for workload entering the high throughput computing infrastructure. It implements one or more scheduling algorithms which assign work to available resources. An example of a throughput scheduler suitable for use in an embodiment of the invention is Condor, from Condor Research Project at the University of Wisconsin-Madison.

The resource manager 112 is a system having control over a pool of machines, a continually evolving workload set, and any number of job management systems 114. The resource manager pairs workload with available machines and initiates processing of that workload via one of the job management systems 114. An example of a resource manager suitable for use in an embodiment of the invention is Torque, commercially available from Cluster Resources, Inc.

The job management systems 114 accept and process units of work represented as jobs, also referred to herein as workload, where the term "job" denotes a piece of work entering the high throughput computing infrastructure. Example jobs include but are not limited to message passing interface (MPI) jobs and batch jobs. Examples of job management systems include parallel processing job management systems such as MPI systems, and batch job processing systems such as the Linux cron daemon. A given job management system may be implemented, for example, as a job submission system.

The snapshot management system 116 can create and correlate snapshots of different types, taken from various products (e.g., Celerra®, Clariion®, VMware®), and expose them as a single point-in-time snapshot. An example of a snapshot management system suitable for use in an embodiment of the invention is Replication Manager, also commercially available from EMC Corporation of Hopkinton, Mass.

In the system 100, the term "resource" is used to denote a logical entity encapsulating a resource manager, a job management system, and supporting infrastructure such as physical and/or virtual machines. A resource profile is the description of a resource expressed in a format that can depict its capabilities and structure. For example, a resource profile may contain information about the resource manager type, the types of job management systems, and virtual infrastructure contained in or otherwise associated with the resource. The physical machines, virtual machines and storage volumes within a resource are referred to as assets. A complex asset is an entity composed of multiple assets within a resource. For example, a complex asset may be a virtual cluster containing three virtual machines and a single network attached storage volume. Another example would be three network attached storage volumes.

The processing platforms 122 in the system 100 of FIG. 1 include, by way of example, a batch processing system 124 and a parallel processing system 126. These processing systems are examples of managed resource types in the present embodiment. Each such processing system includes a physical network interface card (NIC), a virtual switch 132 which is illustratively associated with a virtual machine (VM) network, and multiple physical machines 134. Also part of the processing platforms 122 are storage volumes such as those illustratively shown at 140 and 142. The storage volumes 140 include virtual machine disk (VMDK) volumes, virtual machine file system (VMFS) volumes, and a 500 gigabyte (GB) logical unit number (LUN) volume. The storage volumes 142 include one or more network file system (NFS) volumes. Numerous other types and arrangements of storage volumes may be implemented in the processing platforms 122.

As indicated previously, the throughput scheduler schedules jobs 145, which may more particularly include a batch job 146 and an MPI job 148, for processing on resources such as resources 150, each of which includes a virtual switch 152 and various arrangements of machines 154.

It is to be appreciated that a given embodiment of the system 100 may include multiple instances of the components 110, 112, 114, 116 and 120, and other system elements, although only single instances of such components and elements are shown in the system diagram for clarity and simplicity of illustration.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

Figure 2:
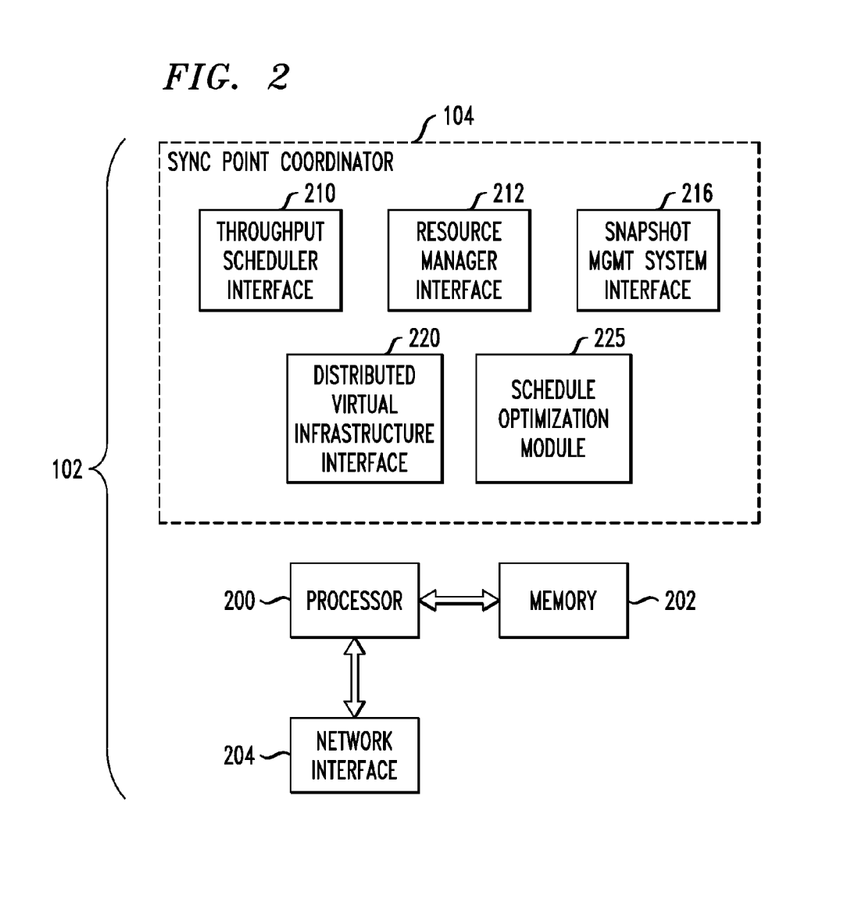
FIG. 2 is a more detailed view of the sync point coordinator of the FIG. 1 system.

FIG. 2 shows a more detailed view of the controller 102 and sync point coordinator 104 in an illustrative embodiment. The controller 102 in this embodiment comprises a processor 200 coupled to a memory 202. The processor 200 may comprise a microprocessor, a microcontroller, an application-specific integrated circuit (ASIC), a field programmable gate array (FPGA) or other type of processing circuitry, as well as portions or combinations of such circuitry elements.

The memory 202 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device comprising controller 102 causes the device to perform functions such as coordinating any operations of components 110, 112, 114 and 116 that involve utilization of the distributed virtual infrastructure 120. Similarly, computer program code may be used to implement other functionality associated with the sync point coordinator 104, such as coordinating high throughput job processing in a high throughput cloud computing implementation of system 100. This may involve, for example, determining an optimal schedule for processing of jobs by the distributed virtual infrastructure. One skilled in the art would be readily able to implement such software given the teachings provided herein. Other examples of computer program products embodying aspects of the invention may include, for example, optical or magnetic disks.

Also included in the controller 102 is network interface circuitry 204, which may be used to interface the controller 102 and its associated sync point coordinator 104 with components 110, 112, 114, 116 and 120, or other system elements. Such circuitry may comprise conventional transceivers of a type well known in the art.

The controller 102 may be implemented on a common processing platform with one or more of the components 110, 112, 114, 116 and 120, or on a separate processing platform comprising a stand-alone computer, server or other processing device.

The sync point coordinator 104 in the present embodiment comprises a number of interface modules 210, 212, 216 and 220, and a schedule optimization module 225. These modules of the sync point coordinator 104 may be implemented in whole or in part in the form of one or more software programs stored in memory 202 and executed by processor 200. The controller 102 implements a scheduling algorithm for coordinating operations of the sync components of system 100 that involve utilization of the distributed virtual infrastructure 120. The scheduling algorithm may be optimized through the operation of the schedule optimization module 225 of the sync point coordinator 104, using inputs received via the interfaces 210, 212, 216 and 220.

The interface modules 210, 212, 216 and 220 of the sync point coordinator 104 are configured to support communications between the sync point coordinator and the corresponding sync points 110, 112, 114, 116 and 120, respectively. Other interfaces may be included, such as an interface with job management systems 114, although in the present embodiment this particular functionality is assumed without limitation to be part of the resource manager interface module 212. In other embodiments, the sync point controller 104 may therefore interface directly with the job management systems 114.

It should be noted that the controller 102 and sync point coordinator 104 may comprise other modules or components in addition to those specifically shown in FIG. 2. For example, conventional modules of a type known to those skilled in the art may be incorporated into the controller or sync point coordinator.

The operation of the sync point coordinator 104 and the sync points 110, 112, 114, 116 and 120 will now be described in greater detail with reference to FIGS. 3 through 9.

Figure 3:
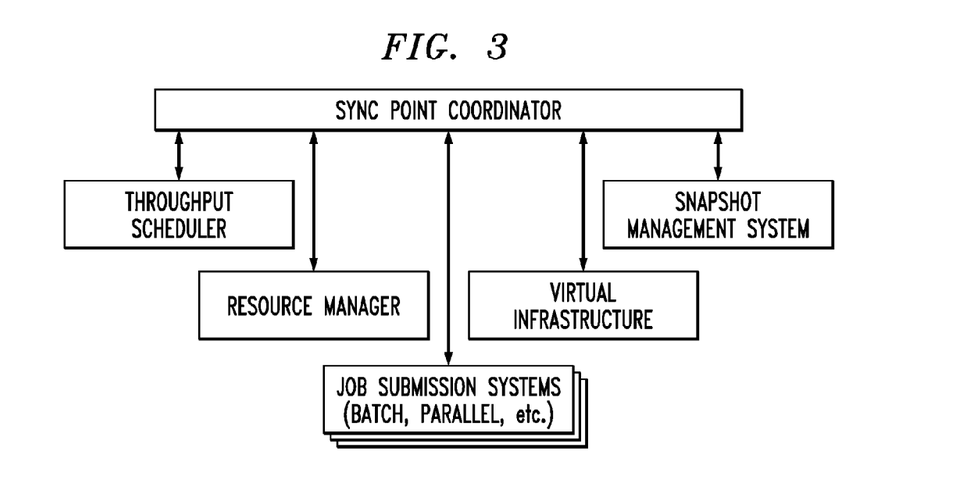
FIG. 3 shows component interactions in the FIG. 1 system from a viewpoint of the sync point coordinator.

FIG. 3 is a diagram illustrating component interactions in the system 100 of FIG. 1 from the viewpoint of the sync point coordinator 104. As shown, the sync point coordinator in this example interacts with the sync points 110, 112, 114, 116 and 120, including multiple job submission systems 114 which may include batch, parallel, etc.

Figure 4:
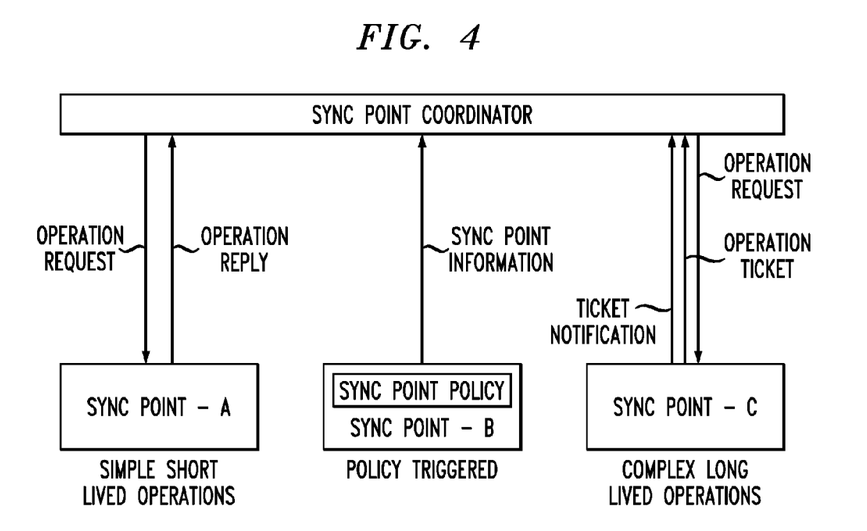
FIG. 4 illustrates exemplary communications between the sync point coordinator and various sync points of the FIG. 1 system.

As indicated previously, the sync point coordinator 104 provides resilient high throughput job processing, via coordinated resource scheduling across distributed virtual infrastructures. It is the central entity having a full view of sync points contained in the high throughput computing infrastructure. The sync point coordinator in this view interacts with the throughput scheduler 110, resource manager 112, job submission systems 114, snapshot management system 116 and virtual infrastructure 120. Its interactions with the various sync points are performed so as to facilitate system level operation. Examples of such system level operations include the following:

1. Checking if a job can be run within the high throughput computing infrastructure
2. Adding a job to the high throughput computing infrastructure
3. Pausing a job in the high throughput computing infrastructure
4. Checkpointing a job in the high throughput computing infrastructure 5. Reconstituting a job from checkpoint within the high throughput computing infrastructure
6. Managing a job checkpoint tree within the high throughput computing infrastructure
7. Suspending a job in the high throughput computing infrastructure
8. Removing a job from the high throughput computing infrastructure
9. Migrating a job within the high throughput computing infrastructure
10. Tracking a job within the high throughput computing infrastructure
11. Querying the status of a job within the high throughput computing infrastructure
12. Changing a job's priority within the high throughput computing infrastructure
13. Adding a resource within the high throughput computing infrastructure
14. Removing a resource within the high throughput computing infrastructure
15. Querying a resource profile within the high throughput computing infrastructure FIG. 4 illustrates different types of communication that may occur between the sync point coordinator 104 and the sync points 110, 112, 114, 116 and 120 of system 100. Communication occurs in a bidirectional manner between all sync points within the high throughput computing infrastructure, meaning that messages can flow from the sync point coordinator 104 to the sync points and vice versa. Communication can occur synchronously or asynchronously. Communication may be the result of operational requests originating from the sync point coordinator. In addition, communication may originate from any sync point as a result of policy defined within that sync point.

Communications originating from the sync point coordinator 104 may be synchronous or asynchronous, because they may be the result of either short lived or long lived operations. Simple short lived operations may be performed via remote procedure calls. In this instance the operation can conclude in a timely manner thus allowing the sync point coordinator to wait for a response from the sync point. Complex long lived operations requested by the sync point coordinator should be performed asynchronously. In this scenario the operation is scheduled with no expectation that the operation will conclude in short order. Here an operation ticket is received as a result of performing the operation, thus allowing the sync point coordinator to open an event notification subscription for the long lived operation. Examples of short lived operations may include querying status of a job, changing priority of a job and querying a resource profile. Examples of long lived operations may include migrating a job and suspending a job.

Communications originating from sync points, which are destined for the sync point coordinator 104, are the result of policy definitions within the sync points. All sync points have the ability to send information of varying importance back to the sync point coordinator. The level of importance a particular information type holds may be set by a sync point administrator via policy definitions. For example, it may be very important for the sync point coordinator to receive information about the exact time added jobs are sent to a resource. Here a policy could be defined within the throughput scheduler 110 to send notifications to the sync point coordinator every time a job is scheduled against a resource. This is one example of how policy can be the impetus behind communication originating from the sync points to the sync point coordinator.

Figure 5:
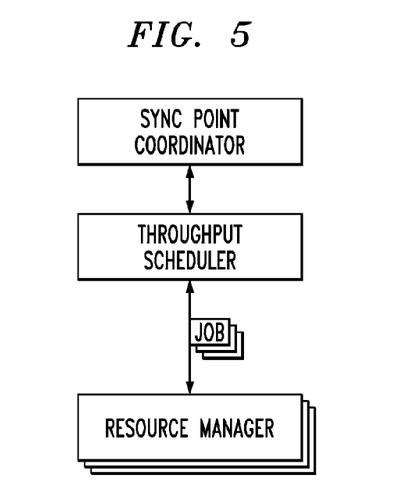
FIGS. 5 through 9 show component interactions in the FIG. 1 system from viewpoints of the throughput scheduler, resource manager, job management system, virtual infrastructure and snapshot management system, respectively.

FIG. 5 illustrates component interactions in the system 100 from the viewpoint of the throughput scheduler 110. The throughput scheduler implements advanced scheduling algorithms ensuring the distributed virtual infrastructure resources remain completely utilized. It contains a resource profile for each resource registered in the high throughput computing infrastructure. These resource profiles are used to pair resources and jobs. These pairings are placed onto a scheduling queue, which is the data structure augmented by the sync point's scheduling algorithm. As a job advances in the sync point's scheduling queue, notifications of the job's status may be sent back to the sync point coordinator. Ultimately, the job will be scheduled against a resource, at which point control is handed to the resource manager, which assumes responsibility for ensuring timely job processing.

As shown in FIG. 5, the throughput scheduler 110 communicates with the sync point coordinator 104 and the resource manager 112. Any number of protocols can be adopted to facilitate this communication. Communication between the throughput scheduler and resource manager is bi-directional, meaning messages flow from the throughput scheduler to the resource manager and vice-versa. When communication is directed from the throughput scheduler to the resource manager its purpose may be to carry operation directives such as schedule a job and migrate a resource. Communication directed from the resource manager to the throughput scheduler carries metadata regarding the virtual infrastructure and allocated jobs. Additional details regarding communication between the sync point coordinator and the throughput scheduler were described above in conjunction with FIG. 4.

The resource profile described previously is an important data structure for the throughput scheduler 110, because a resource can take on numerous forms. It can be, for example, a tightly coupled virtual cluster, a highly distributed set of hypervisors or other hosts as seen in grid computing environments, or even an individual virtual machine. It can be viewed as a unit meant to encapsulate the virtual infrastructure which supports execution of a particular workload variant. For instance, a resource associated with batch processing may be a virtual machine. Similarly, a resource associated with parallel processing workload may be a virtual cluster. Each resource has common metadata as well as metadata unique to its resource type. The metadata is made apparent via the resource profile.

Figure 6:
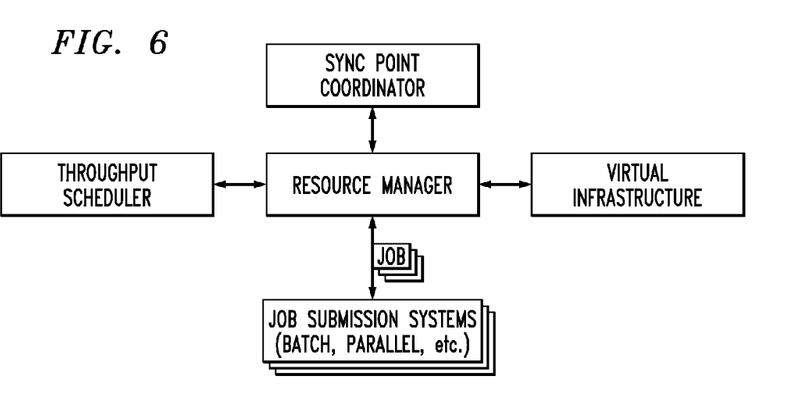

FIG. 6 illustrates component interactions in the system 100 from the viewpoint of the resource manager 112. The resource manager is the entry point for jobs into a resource. It maintains information about virtual infrastructure and may incorporate one or more job processing systems. For example, it is possible to have a resource manager that can only process batch jobs. Alternatively, the resource manager can include both parallel and batch job processing systems.

In order to process workload in the high throughput computing infrastructure, a job must be allocated to the assets it requires to run. This is the job of the resource manager 112. It consistently maintains an asset pool. Each virtual machine in the pool communicates its status to the resource manager. As a result, the resource manager has an understanding of which assets are fully-utilized and which are under-utilized. As assets become available they are paired with jobs on a scheduling queue of the resource manager. Eventually the job is run on an allocated virtual machine set. This is accomplished by the resource manager interacting with the appropriate job management system. Throughout its lifecycle each job communicates status back to the resource manager.

The resource manager 112 keeps a detailed status of all jobs it has scheduled on resources within its domain. That aggregate job status set may be made available in whole or in part to the sync point coordinator 104 at any time. The resource manager may accept requests such as run job from the throughput scheduler 110. Examples of requests the resource manager may accept from the sync point coordinator include: pause job, checkpoint job, suspend job, resume job, migrate job, query status, and change priority.

As indicated in FIG. 6, the resource manager 112 communicates with throughput scheduler 110, job submission system 114 and virtual infrastructure 120, as well as sync point coordinator 104. The resource manager performs a number of functions. First, it issues infrastructure management directives to assets within its domain of control. Second, it aggregates metadata about its controllable resources, which is in turn exposed for the sync point coordinator. Resource metadata is obtained via interaction with the virtual infrastructure and the job management system. Third, it submits workload by pairing available resources with compatible jobs. For instance, if a batch job is received the resource manager may allocate an underutilized virtual machine to the job. Likewise, appropriately sized virtual clusters may be paired with parallel job requests. Fourth, it receives and exposes job state information via metadata exposed by the job submission system. The job state information may be specific for the type of workload. Some example states include: scheduled, staging-in data, executing, staging-out data, migrating, percentage complete, etc. All interactions between the resource manager, sync point coordinator, throughput scheduler, job submission system and virtual infrastructure may be implementing via well defined protocols, which may take on various forms as will be appreciated by those skilled in the art.

The resource manager 112 maintains a number of data structures in order to perform its function. It maintains a scheduler queue, which can be priority based, for jobs to reside within while they await virtual machines. The resource manager also maintains an asset pool. Each virtual machine in the pool will generally have metadata associated with it in order to express its state and description. The state is used in order to determine if the machine is already allocated to a job. The description is used to properly associate a machine's capabilities with a job's requirements.

Figure 7:
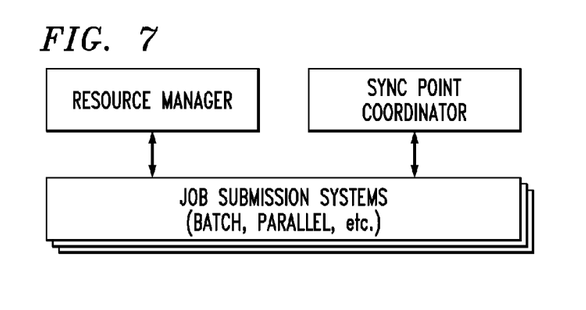

FIG. 7 illustrates component interactions in the system 100 from the viewpoint of a particular one of the job management systems 114, also referred to in this example as a job submission system.

As mentioned previously, the job submission system interacts with the resource manager 112. Its purpose is to process allocated workload. This workload can take on any number of varying forms, from simple batch processing seen in Linux cron, to complex scientific parallel processing found in MPI, to Hadoop map-reduce workload, and so on. The sync point coordination is intentionally generic in this manner. The job submission system receives workload from the resource manager in the event that the resource it resides within is underutilized. Subsequently, the job will be initiated and begin reporting state. The job state may be reported to the resource manager via metadata contained in the network protocol. This allows the resource manager to make load balancing decisions and create a federated view of all jobs within its domain.

In the present embodiment, the job submission system 114 communicates with the resource manager 112 via a closer integration than is seen between other sync points. The controlling process of a job submission system is likely to reside on the same machine as the resource manager. For example, the job submission system may be integrated into the resource manager via a plug-in. In this manner the job submission system management becomes an extension of the resource manager. Communication for an integrated scenario may utilize local procedure calls, while communication for a distributed scenario may utilize a remote procedure call mechanism.

Figure 8:
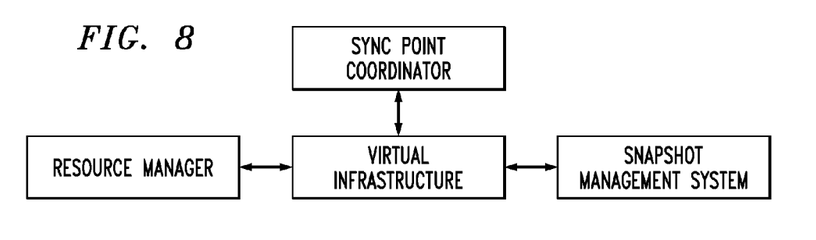

FIG. 8 illustrates component interactions in the system 100 from the viewpoint of the virtual infrastructure 120. As noted above, the virtual infrastructure comprises one or more hypervisors and associated management systems. The virtual infrastructure communicates with the sync point coordinator 104, the resource manager 112 and the snapshot management system 116. All information about virtual machines under the resource manager domain may be exposed via the virtual infrastructure sync point. In addition, the sync point coordinator can identify any resource within the high throughput computing infrastructure. This means that the sync point coordinator can interact with the entire asset pool within any resource manager's domain. Since the sync point coordinator can control every resource, and the combination of all the resources depicts every virtual machine in the high throughput computing infrastructure, it follows that the sync point coordinator can control any virtual machine in the infrastructure. So the virtual infrastructure sync point should also expose all information to the sync point coordinator.

The virtual infrastructure can communicate a large amount of information to the sync point coordinator and the resource manager. A subset of the expressed information may include, but is not limited to, metadata regarding hosts, hypervisors, virtual machines, virtual clusters, network attached storage, virtual networks, virtual switches and virtual datacenters. These are examples of existing virtual infrastructure metadata that may be exposed via the virtual infrastructure sync point 120.

In addition to reporting information to the sync point coordinator 104 and resource manager 112, the virtual infrastructure 120 also accepts inbound scheduled operations. Some example inbound operations may include requests to suspend a virtual machine, pause a virtual machine, migrate a virtual machine, etc.

Figure 9:
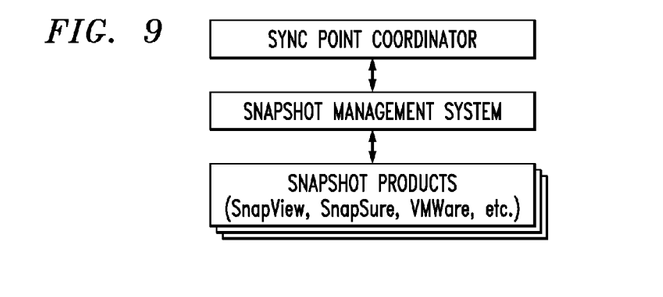

FIG. 9 illustrates component interactions in the system 100 from the viewpoint of the snapshot management system 116. The snapshot management system keeps track of snapshots for a resource within the high throughput computing infrastructure. It maintains a snapshot tree of simple and higher order snapshots for the resource. When many individual point-in-time snapshots are associated with each other, the snapshot management system creates a higher order point-in-time snapshot. This is particularly important when a resource manager allocates a complex asset from its asset pool. It is the responsibility of the snapshot management system to abstract the complexity of combining all the different point-in-time snapshots, such as virtual machine and network attached storage volume snapshots, into a single higher order point-in-time snapshot of the complex asset.

As indicated in the figure, the snapshot management system 116 communicates with the sync point coordinator 104 as well as multiple infrastructure snapshot products that are associated with the virtual infrastructure 120 and the associated distributed processing platforms 122. Communication between the snapshot management system and the sync point coordinator may occur for numerous reasons. A snapshot of any asset in the domain of the snapshot management system can be triggered by the sync point coordinator, thus adding a new snapshot point to the snapshot tree of that asset. All snapshots within the snapshot management system are manageable by the sync point coordinator. The sync point coordinator can request that a snapshot, of any kind, be restored by the snapshot management system. Also, snapshots in the snapshot tree of one or more assets can be deleted by the sync point coordinator. Accordingly, all metadata recorded about snapshots are exposed to the sync point coordinator.

As noted above, the snapshot management system 116 is able to communicate with individual infrastructure snapshot products. These are the products responsible for creating the snapshots of particular asset types. For example, the virtual infrastructure may incorporate a hypervisor such as VMware® vSphere™ or vCenter™ that can take a snapshot of an individual virtual machine. As another example, a storage area network (SAN) system such as Clariion® may incorporate functionality such as SnapView™ to have an ability to take block level snapshots. Similarly, network attached storage NFS volumes may have an associated file system snapshot technology. As an example of such an arrangement, a Celerra® system may incorporate SnapSure™ functionality.

A number of different data structures may be used in the snapshot management system 116. For example, the snapshot management system may maintain a snapshot tree for each asset within a given resource. Such a snapshot tree provides a history of all of the snapshots associated with a particular asset. The snapshot tree is manageable by the sync point coordinator 104. Another data structure under the control of the snapshot management system is the complex asset. As indicated previously, a complex asset can assume many forms. Consider a virtual cluster as a complex asset. It contains a virtual machine set and may associate a set of shared network attached storage volumes. Here there are a number of snapshots that when combined form a higher order snapshot, which is exposed to the sync point coordinator. This higher order point-in-time snapshot contains individual point-in-time snapshots for each virtual machine and network attached storage volume.

As noted above, network protocols may be used to specify interaction between the sync point coordinator 104 and the sync points 110, 112, 114, 116 and 120. Any number of existing network protocols well known to those skilled in the art can be adapted to carry the data associated with operations within the high throughput computing infrastructure. By way of example, network protocols can be defined for the interactions between the system components as shown in FIGS. 3 through 9.

The information processing system 100 with sync point coordinator 104 and suitably configured sync points 110, 112, 114, 116 and 120 in the illustrative embodiments provides a resilient high throughput computing infrastructure having a generic architecture that facilitates coordinated resource scheduling across distributed virtual infrastructure.

It should be noted that the particular interactions, communications, data structures and other system functionality described in conjunction with the diagrams of FIGS. 3 through 9 are presented by way of illustrative example only, and should not be construed as limiting the scope of the invention in any way. Alternative embodiments can use other types of interactions, communications, data structures, etc.

As indicated previously, functionality such as that described in conjunction with the diagrams of FIGS. 3 through 9 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
 a processing device having a processor coupled to a memory;
 wherein the processing device implements a controller configured to coordinate interaction of each of a plurality of synchronization point components of an information processing system with a distributed virtual infrastructure of the information processing system, the controller being coupled between each of the synchronization point components and the distributed virtual infrastructure;
 wherein the distributed virtual infrastructure comprises one or more hypervisors and the controller is implemented externally to the one or more hypervisors;
 wherein the controller is further configured to:
 implement a scheduling algorithm for coordinating operations of the synchronization point components that involve utilization of the distributed virtual infrastructure;
 communicate synchronously with a first one of the synchronization points by transmitting a first operation request to the first synchronization point and receiving in response thereto an operation reply from the first synchronization point; and
 communicate asynchronously with a second one of the synchronization points by transmitting a second operation request to the second synchronization point and receiving in response thereto an operation ticket from the second synchronization point;
 wherein the first operation request is associated with a short lived operation and comprises one of querying status of a job, changing priority of a job and querying a resource profile; and
 wherein the second operation request is associated with a long lived operation and comprises one of migrating a job and suspending a job.

2. The apparatus of claim 1 wherein the controller comprises a synchronization point coordinator having a schedule optimization module.

3. The apparatus of claim 1 wherein the synchronization point components include two or more of a throughput scheduler, a resource manager, a job management system and a snapshot management system.

4. The apparatus of claim 3 wherein the resource manager is arranged between the controller and the job management system.

5. The apparatus of claim 3 wherein the throughput scheduler, the resource manager and the snapshot management system each interface directly with the controller.

6. The apparatus of claim 1 wherein the processing device is part of a processing platform which also implements at least one of the synchronization point components.

7. The apparatus of claim 1 wherein the processing device is part of a processing platform which is separate from each of one or more other processing platforms used to implement the synchronization point components.

8. The apparatus of claim 1 wherein the information processing system comprises a high throughput computing system implemented using the distributed virtual infrastructure.

9. A method of operating an information processing system, the method comprising the steps of:
 providing a controller coupled between each of a plurality of synchronization point components of the information processing system and a distributed virtual infrastructure of the information processing system; and
 coordinating in the controller interactions of each of the synchronization point components with the distributed virtual infrastructure;
 wherein the distributed virtual infrastructure comprises one or more hypervisors and the controller is implemented externally to the one or more hypervisors;
 wherein the coordinating step comprises:
 executing a scheduling algorithm for coordinating operations of the synchronization point components that involve utilization of the distributed virtual infrastructure;
 communicating synchronously with a first one of the synchronization points by transmitting a first operation request to the first synchronization point and receiving in response thereto an operation reply from the first synchronization point; and communicating asynchronously with a second one of the synchronization points by transmitting a second operation request to the second synchronization point and receiving in response thereto an operation ticket from the second synchronization point;

wherein the first operation request is associated with a short lived operation and comprises one of querying status of a job, changing priority of a job and querying a resource profile; and wherein the second operation request is associated with a long lived operation and comprises one of migrating a job and suspending a job.

10. The method of claim 9 wherein the controller comprises a synchronization point coordinator having a schedule optimization module.

11. The method of claim 9 wherein the synchronization point components include two or more of a throughput scheduler, a resource manager, a job management system and a snapshot management system.

12. The method of claim 11 wherein the resource manager is arranged between the controller and the job management system.

13. The method of claim 11 wherein the throughput scheduler, the resource manager and the snapshot management system each interface directly with the controller.

14. A computer program product comprising a non-transitory processor-readable storage medium having encoded therein executable code of one or more software programs, wherein the one or more software programs when executed by a processor of a processing device implement the steps of the method of claim 9.

15. An information processing system comprising:
a distributed virtual infrastructure;
a plurality of synchronization point components that interact with the distributed virtual infrastructure; and
a controller configured to coordinate the interaction of each of the plurality of synchronization point components with the distributed virtual infrastructure, the controller being coupled between each of the synchronization point components and the distributed virtual infrastructure;

wherein the information processing system comprises at least one processing device comprising a processor coupled to a memory; and wherein the distributed virtual infrastructure comprises one or more hypervisors and the controller is implemented externally to the one or more hypervisors wherein the controller is further configured to:

implement a scheduling algorithm for coordinating operations of the synchronization point components that involve utilization of the distributed virtual infrastructure;

communicate synchronously with a first one of the synchronization points by transmitting a first operation request to the first synchronization point and receiving in response thereto an operation reply from the first synchronization point; and communicate asynchronously with a second one of the synchronization points by transmitting a second operation request to the second synchronization point and receiving in response thereto an operation ticket from the second synchronization point;

wherein the first operation request is associated with a short lived operation and comprises one of querying status of a job, changing priority of a job and querying a resource profile; and wherein the second operation request is associated with a long lived operation and comprises one of migrating a job and suspending a job.

16. The system of claim 15 wherein the controller comprises a synchronization point coordinator having a schedule optimization module.

17. The system of claim 15 wherein the synchronization point components include two or more of a throughput scheduler, a resource manager, a job management system and a snapshot management system.

18. The system of claim 17 wherein the resource manager is arranged between the controller and the job management system.

19. The system of claim 17 wherein the throughput scheduler, the resource manager and the snapshot management system each interface directly with the controller.

* * * * *